(12) United States Patent
Jakubov et al.

(10) Patent No.: US 10,735,229 B1
(45) Date of Patent: Aug. 4, 2020

(54) LIMITER FOR TRASMITTERS

(71) Applicant: QUALCOMM Incorporated, San Diego, CA (US)

(72) Inventors: Ondrej Jakubov, Bristol (GB); Steven Meade, Bristol (GB); Matthew Collins, Bradford on Avon (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/423,770

(22) Filed: May 28, 2019

(51) Int. Cl.
*H04L 27/12* (2006.01)
*H04B 1/04* (2006.01)

(52) U.S. Cl.
CPC ............ *H04L 27/122* (2013.01); *H04B 1/04* (2013.01)

(58) Field of Classification Search
CPC ....... H04L 27/122; H04B 1/04; H04B 14/008; H04B 7/00
See application file for complete search history.

(56) References Cited

U.S. PATENT DOCUMENTS

| | | | | |
|---|---|---|---|---|
| 7,274,748 B1* | 9/2007 | Khlat | ................. | H03F 1/0222 375/296 |
| 2003/0215026 A1* | 11/2003 | Hietala | .................. | H03C 5/00 375/297 |
| 2004/0198414 A1* | 10/2004 | Hunton | ............... | H03F 1/0222 455/550.1 |

OTHER PUBLICATIONS

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
IEEE 802.15.1-2005, Part 15.1: Wireless medium access control (MAC) and physical layer (PHY) specifications for wireless personal area networks (WPANs), 2005, 600 pages.
Ergen S., "ZigBee/IEEE 802.15.4 Summary", Sep. 10, 2004, 37 pp.
Goldsmith A., "Designing Reliable Wi-Fi for HD Delivery throughout the Home", Quantenna Communications, White Paper, uploaded on 2016, 10 pages.
Stauth J.T., et al., "Energy Efficient Wireless Transmitters: Polar and Direct-Digital Modulation Architectures," Feb. 4, 2009, pp. 1-183.
Kushal M.L., et al., "Design and Implementation of Phase Modulation Using PLL for Polar Transmitter", International Journal of Inventive Engineering and Sciences (IJIES), Nov. 2013, vol. 1, No. 12, ISSN: 2319-9598, pp. 35-41.
Groe J.,"Polar Transmitters for Wireless Communications", IEEE Communications Magazine, Sep. 2007, pp. 58-63.

(Continued)

*Primary Examiner* — Jean B Corrielus
(74) *Attorney, Agent, or Firm* — Shumaker & Sieffert, P.A.

(57) ABSTRACT

In general, techniques are described for limiters used in wireless transmitters. A transmitter comprising a frontend circuit and a backend circuit may perform various aspects of the limiter techniques. The frontend circuit may obtain a data symbol of a plurality of data symbols representative of data to be transmitted wirelessly, and determine an amplitude and a phase representative of the data symbol. The frontend circuit may also transform the phase to a frequency, compare the frequency to a threshold frequency, and adjust, based on the comparison of the frequency to the threshold frequency, the frequency to obtain an adjusted frequency. The backend circuit configured may obtain, based on the amplitude and the adjusted frequency, a wireless signal, and transmit the wireless signal.

28 Claims, 10 Drawing Sheets

(56) References Cited

OTHER PUBLICATIONS

Philippe P., "A Zero Crossing Avoidance Predistortion Technique for Polar Transmitters,", 2008, ICECS 2008, 15th IEEE International Conference on Electronics, Circuits and Systems, pp. 814-817.

* cited by examiner

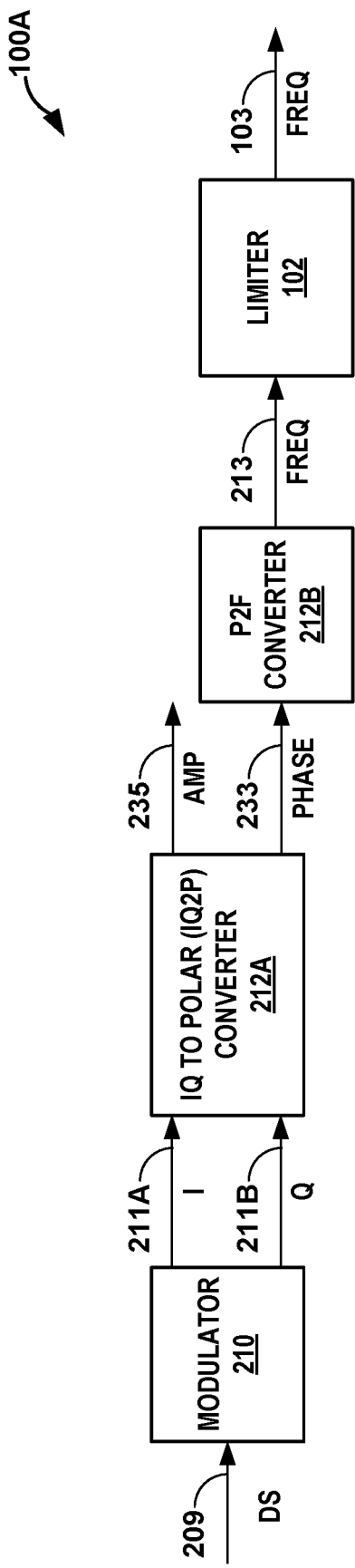
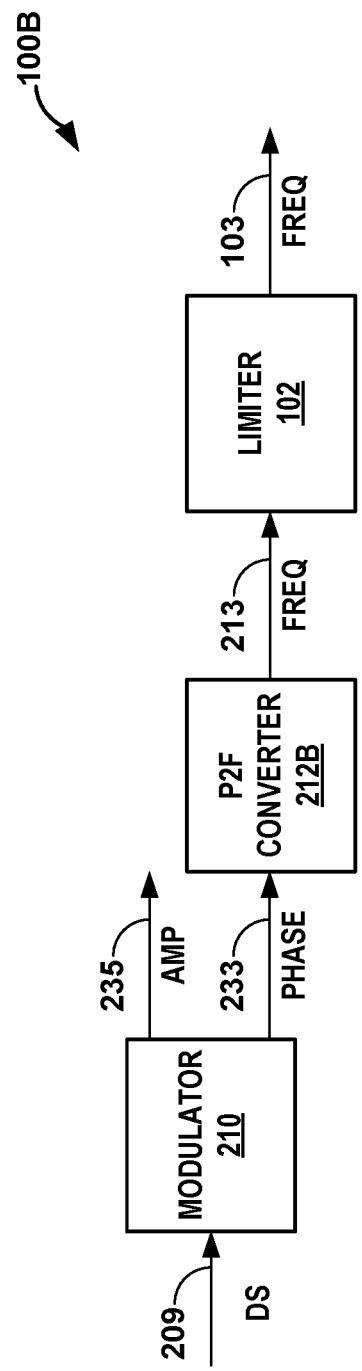
FIG. 5A
FIG. 5B

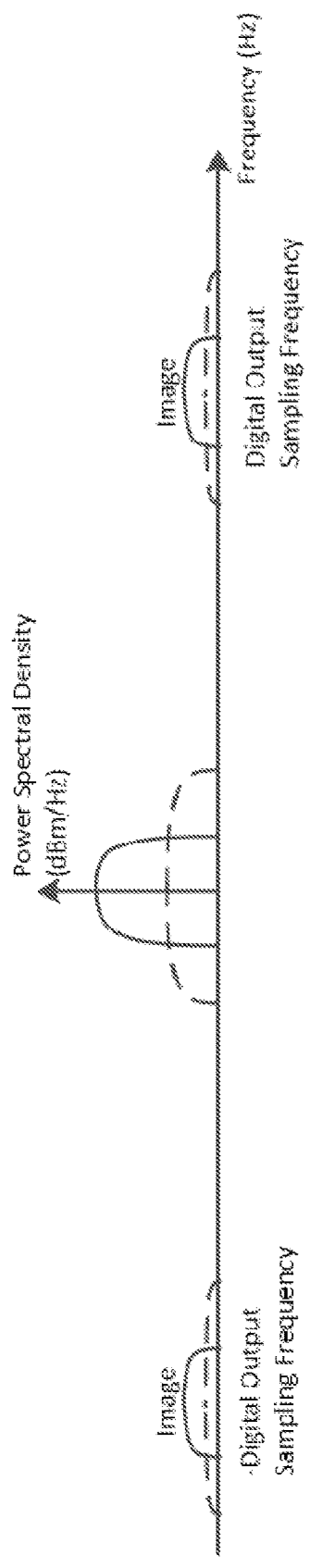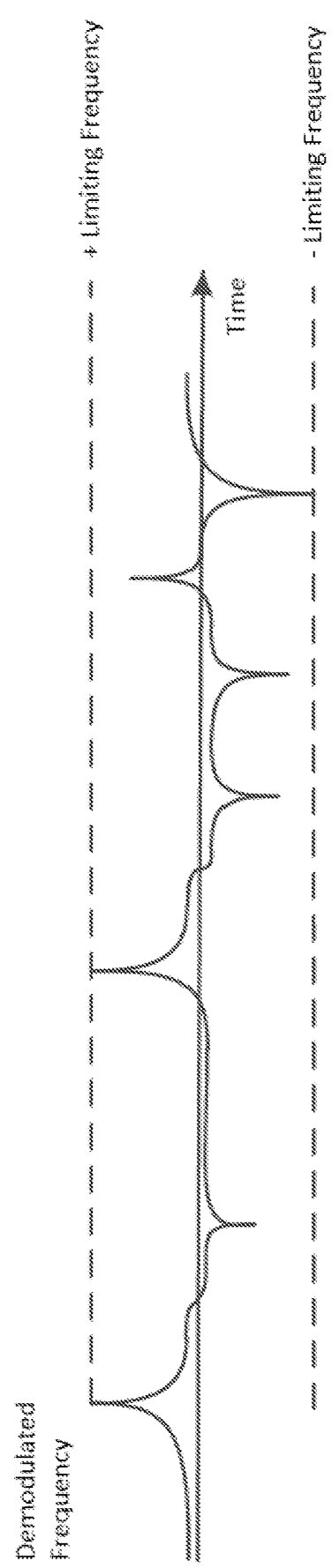
FIG. 6
FIG. 7

LIMITER FOR TRASMITTERS

TECHNICAL FIELD

This disclosure relates to transmitters, and more specifically, limiters for transmitters.

BACKGROUND

Computing devices may communicate wirelessly in a number of different ways, such as via wireless standards set forth by the Institute of Electrical and Electronics Engineers (IEEE) 802.11 (including versions A, B, G, N, AC, etc., which define the WiFi™ family of standards), previously IEEE 802.15.1 (Bluetooth®—which is now managed by the Bluetooth Special Interest Group), IEEE 802.15.4 (Zigbee), and other proprietary and non-proprietary (or in other words, open source or common) standards. As many computing devices are power limited (e.g., due to use of batteries rather than dedicated, constant supply power sources), radio frequency (RF) or other wireless transmitters that support wireless communication are evolving to consume less power, while still achieving adequate signal to noise ratios (SNR) for communication of data symbols.

Recent development of transmitter circuitry has moved away from employing a quadrature modulation (which makes use of Cartesian coordinates) to using a polar modulation (which makes use of polar coordinates). The so-called "polar transmitter" may represent a modulated signal in polar coordinates (e.g., an amplitude and phase), combining the amplitude and phase to produce the output antenna signal. The polar transmitter may use dynamic modulation of the power amplification to transmit amplitude information, thereby resulting in potentially higher average energy efficiency compared to transmitters using quadrature modulation, which requires a linear RF power amplifier. However, the polar transmitter may suffer from drawbacks related to linearity (which may result in instability of the output signal), time-alignment of the amplitude and phase signals, and power supply noise.

SUMMARY

In general, various aspects of the techniques are directed to limiters for transmitters that potentially limit or otherwise reduce impairments in communication of data symbols. A representation of the phase (e.g., which may be converted into a frequency value) can introduce impairments as a result of exceeding a maximum frequency deviation associated with underlying circuitry that support transmission. In one or more examples, rather than allow a representation of the phase (e.g., which may be converted into a frequency value) for any given data symbol to exceed a threshold value, the wireless transmitter may include a limiter to adjust the frequency value to be within a maximum frequency deviation supported by analog backend circuitry (e.g., a digital to analog converter in combination with a phase locked loop circuit that produces the analog wireless signal).

In this respect, various aspects of the limiter techniques described in this disclosure may improve operation of polar transmitter by improving operation of the transmitter itself in terms of potentially reducing instances of undesirable effects due to frequency deviations above the maximum frequency deviation supported by analog backend circuitry. Potentially reduced undesirable effects may result in reduced error vector magnitudes that potentially improve signal to noise ratios (SNR) without possibly requiring increased power consumption. As such, various aspects of the limiter techniques described in this disclosure may improve operation of polar transmitter by improving operation of the transmitter itself.

In one aspect, this disclosure is directed to a transmitter configured to support wireless communication, the transmitter comprising: a frontend circuit configured to: obtain a data symbol of a plurality of data symbols representative of data to be transmitted wirelessly; determine an amplitude and a phase representative of the data symbol; transform the phase to a frequency; compare the frequency to a threshold frequency; adjust, based on the comparison of the frequency to the threshold frequency, the frequency to obtain an adjusted frequency; and a backend circuit configured to: obtain, based on the amplitude and the adjusted frequency, a wireless signal; and transmit the wireless signal.

In another aspect, this disclosure is directed to a method of supporting wireless communication, the method comprising: obtaining, by a frontend circuit of a transmitter, a data symbol of a plurality of data symbols representative of data to be transmitted wirelessly; determining, by the frontend circuit, an amplitude and a phase representative of the data symbol; transforming, by the frontend circuit, the phase to a frequency; comparing, by the frontend circuit, the frequency to a threshold frequency; adjusting, by the frontend circuit and based on the comparison of the frequency to the threshold frequency, the frequency to obtain an adjusted frequency; obtaining, by a backend circuit and based on the amplitude and the adjusted frequency, a wireless signal; and transmitting, by the backend circuit, the wireless signal.

In another aspect, this disclosure is directed to a non-transitory computer-readable medium having stored thereon instructions that, when executed, cause one or more processors of a transmitter to: obtain a data symbol of a plurality of data symbols representative of data to be transmitted wirelessly; determine an amplitude and a phase representative of the data symbol; transform the phase to a frequency; compare the frequency to a threshold frequency; adjust, based on the comparison of the frequency to the threshold frequency, the frequency to obtain an adjusted frequency; and output, to an analog backend circuit, the adjusted frequency for producing and transmitting a wireless signal representative of the data symbol.

In another aspect, this disclosure is directed to an apparatus configured to support wireless communication, the apparatus comprising: means for obtaining a data symbol of a plurality of data symbols representative of data to be transmitted wirelessly; means for determining an amplitude and a phase representative of the data symbol; means for transforming the phase to a frequency; means for comparing the frequency to a threshold frequency; means for adjusting, based on the comparison of the frequency to the threshold frequency, the frequency to obtain an adjusted frequency; means for obtaining, based on the amplitude and the adjusted frequency, a wireless signal; and means for transmitting the wireless signal.

The details of one or more aspects of the techniques are set forth in the accompanying drawings and the description below. Other features, objects, and advantages of these techniques will be apparent from the description and drawings, and from the claims.

BRIEF DESCRIPTION OF DRAWINGS

FIGS. 5A-5D are block diagrams illustrating different transmitter architectures in which various aspects of the limiter techniques described in this disclosure may be performed.

FIG. 6 is a diagram illustrating an example result of various aspects of the limiter techniques in terms of a power spectral density of a modulated signal with zero crossing avoidance.

FIG. 7 is a diagram illustrating an example result of various aspects of the limiter techniques in terms of a frequency modulated waveform with limited frequency.

DETAILED DESCRIPTION

Figure 1:
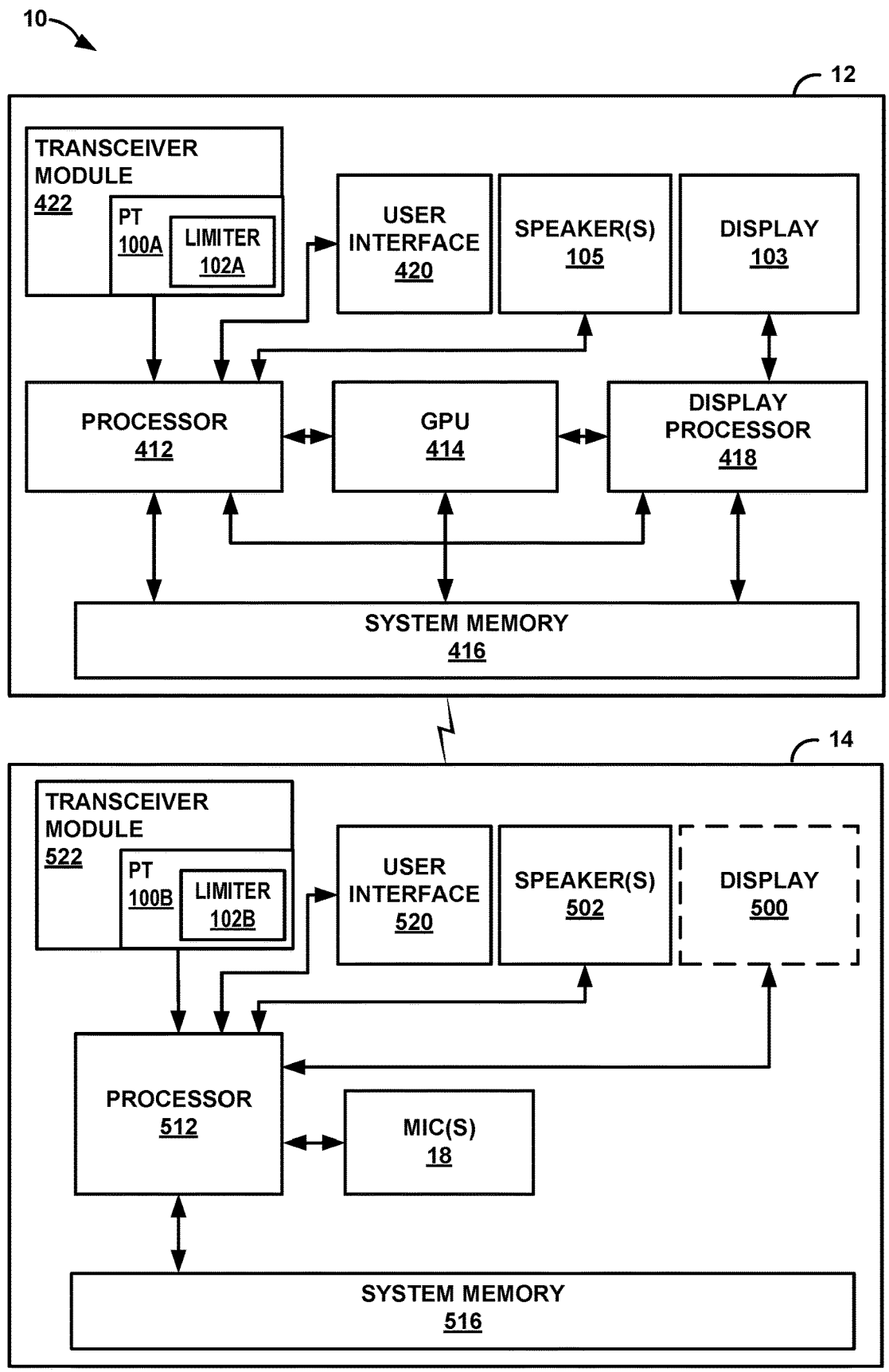
FIG. 1 is a block diagram illustrating an example system configured to perform various aspects of the limiter techniques described in this disclosure.

Computing devices are increasingly relying on wireless connections to interface with supporting computing devices (e.g., headphones—including smart headphones with digital assistants, speakers—including smart speakers that feature digital assistants, smart home products—including smart switches, smart thermostats, smart plugs, etc. and various other devices) rather than wired connections. Such computing devices may communicate wirelessly in a number of different ways, such as via wireless standards set forth by the Institute of Electrical and Electronics Engineers (IEEE) 802.11 (including versions A, B, G, N, AC, etc., which define the WiFi™ family of standards), previously IEEE 802.15.1 (Bluetooth®—which is now managed by the Bluetooth Special Interest Group), IEEE 802.15.4 (Zigbee), and other proprietary and non-proprietary (or in other words, open source or common) standards.

Further, computing devices are increasingly relying on limited power supplies (e.g., a battery) rather than a fixed power sources (e.g., a dedicated connection to a near limitless power source for the amount of power drawn by typical computing devices). Because of the reliance on a limited power supply, developers of computing devices, such as cellular phones—including so-called "smart phones," are attempting to conserve power to increase a duration in which the computing device may remain operational. As such, the developers have begun to address the components of the computing devices that consume disproportionate amounts of power, such as displays, processors, memory, and transmitters.

With respect to transmitters, radio frequency (RF) or other wireless transmitters that support wireless communication are evolving to consume less power, while still achieving adequate signal to noise ratios (SNR) for communication of data symbols and potentially satisfying requirements on unwanted spectral emissions to coexist or inter-operate with other systems sharing a common communication channel. For some contexts, recent development of transmitter circuitry has moved away from employing a quadrature modulation (which makes use of Cartesian coordinates) to using a polar modulation (which makes use of polar coordinates).

The so-called "polar transmitter" may represent the data symbols as polar coordinates (e.g., an amplitude and phase), combining the amplitude and phase to produce the output antenna signal. The polar transmitter may use dynamic modulation of the power amplification to transmit amplitude information, thereby resulting in potentially higher average energy efficiency compared to transmitters using quadrature modulation, which requires a linear RF power amplifier.

That is, the polar transmitter may include a digital frontend circuit that performs modulation and signal conditioning to obtain a digital representation of the amplitude and phase and an analog backend circuit that converts the digital representation of the amplitude and phase to an analog signal that is processed to produce the antenna output signal (or, in other words, the wireless signal). The digital frontend circuit may modulate the signal according to one or more modulation schemes, such as phase-shift keying (PSK), differential PSK (DPSK), quadrature amplitude modulation (QAM), orthogonal frequency-division modulation (OFDM), etc., to produce a data symbol. The digital frontend circuit may convert, in some instances, the data symbol from the cartesian coordinate system to the polar coordinate system to obtain an amplitude and phase. The digital frontend circuit may next convert the phase to a frequency and output the amplitude and frequency to the analog backend circuit.

The analog backend circuit may include a digital-to-analog converter (DAC), a phase locked loop (PLL) circuit for frequency modulation and a power amplifier for amplitude modulation. The DAC may convert the amplitude and frequency from the digital domain (e.g., bits) to the analog domain (e.g., signals) that are used to drive the PLL circuit and the power amplifier. The PLL circuit may include a voltage controlled oscillator (VCO) that controls transmitted frequency modulation as a function of the frequency of the analog signal (e.g., the DAC output). The power amplifier amplifies the output of the PLL circuit based on the amplitude signal, thereby enabling amplitude modulation.

Although amplitude modulation may enable less power consumption compared to the linear power amplifiers of quadrature transmitters, the PLL circuit of the polar transmitter may introduce impairments in the transmitted signal when certain maximum frequency deviations are exceeded due to limitations of the VCO. Widely used modulation schemes, such as the above noted PSK, DPSK, QAM, OFDM, etc., may result in IQ (in-phase and quadrature components, which is another way to denote the XY axes of the cartesian coordinate system) trajectory crossing the origin, which may lead to peaks of instantaneous frequency, in the digital domain nearing half of the sampling rate. In addition, the digital frontend circuit may further upsample the frequency (e.g., prior to outputting), which may further increase the frequency response needed by the PLL to follow the new sample rate. The large changes to the frequency may exceed the maximum frequency deviations resulting in potential impairments that may introduce errors during communication of the data symbols.

As a result, modulators that produce the representations of the data symbol may incorporate a process referred to as zero crossing avoidance (ZCA). ZCA refers to a process that avoids large frequency deviations by avoiding the cartesian trajectory passing through the origin. However, as noted above, even after adapting ZCA, the upsampling in the digital frontend circuit may greatly increase the frequency deviation, potentially resulting in design compromises.

For example, either ZCA has to be designed to provide more pronounced avoidance so as to reduce the maximum frequency deviation to support the successive upsampling, or the upsampling may be designed not to increase the deviation, which may result in poor pass-band response leading to error vector magnitude (EVM) degradation. Another example compromise may be to leave ZCA and upsampling unchanged, but to design the analog backend circuit to be more capable, which may result in additional consumption of physical board space and power.

In accordance with various aspects of the techniques described in this disclosure, the polar transmitter may include a limiter that is applied after modulation and upsampling that may potentially limit or otherwise reduce conditions (e.g., frequencies that exceed the maximum frequency deviations) that result in impairments in communication of data symbols. Rather than allow a representation of the phase (e.g., the frequency) for any given data symbol to exceed a threshold value, and thereby introduce impairments as a result of exceeding a maximum frequency deviation associated with underlying circuitry that support transmission, the limiter may adjust the frequency value to be within the maximum frequency deviation supported by the analog backend circuitry.

In this respect, various aspects of the limiter techniques described in this disclosure may improve operation of polar transmitter by improving operation of the transmitter itself in terms of potentially reducing instances of impairments due to frequency deviations above the maximum frequency deviation. Potentially reduced impairments may result in reduced EVM that potentially improve signal to noise ratios (SNR) without possibly requiring increased power consumption (which may be associated with changes to the analog backend circuitry to accommodate higher frequency deviations). As such, various aspects of the limiter techniques described in this disclosure may improve operation of the polar transmitter itself.

FIG. 1 is a block diagram illustrating an example system configured to perform various aspects of the limiter techniques described in this disclosure. In the example of FIG. 1, system 10 includes a connected computing device 12 and a supporting computing device 14.

The connected computing device 2 includes a processor 412, a graphics processing unit (GPU) 414, a system memory 416, a display processor 418, one or more integrated speakers 105, a display 103, a user interface 420, and a transceiver module 422. Although described herein with respect to various "modules," it should be understood that various modules may also be referred to as "units," which may comprise instructions (or, in other words, software) stored to a non-transitory computer readable media that, when executed, cause one or more processors (as defined elsewhere in this disclosure), hardware (as defined elsewhere int his disclosure, e.g., as application specific integrated circuits, logical circuits, logical circuitry, circuitry, field programmable gate arrays, etc.), or a combination of hardware and software configured to perform the operations attributed to the modules herein.

In examples where the connected computing device 12 is a mobile device (e.g., a so-called smartphone), the display processor 418 is a mobile display processor (MDP). In some examples, such as examples where the connected computing device 12 is a mobile device, the processor 412, the GPU 414, and the display processor 418 may be formed as an integrated circuit (IC).

For example, the IC may be considered as a processing chip within a chip package and may be a system-on-chip (SoC). In some examples, two of the processors 412, the GPU 414, and the display processor 418 may be housed together in the same IC and the other in a different integrated circuit (i.e., different chip packages) or all three may be housed in different ICs or on the same IC. However, it may be possible that the processor 412, the GPU 414, and the display processor 418 are all housed in different integrated circuits in examples where the source device 12 is a mobile device.

Examples of the processor 412, the GPU 414, and the display processor 418 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 412 may be the central processing unit (CPU) of the computing device 12. In some examples, the GPU 414 may be specialized hardware that includes integrated and/or discrete logic circuitry that provides the GPU 414 with massive parallel processing capabilities suitable for graphics processing. In some instances, GPU 414 may also include general purpose processing capabilities, and may be referred to as a general-purpose GPU (GPGPU) when implementing general purpose processing tasks (i.e., non-graphics related tasks). The display processor 418 may also be specialized integrated circuit hardware that is designed to retrieve image content from the system memory 416, compose the image content into an image frame, and output the image frame to the display 103.

The processor 412 may execute various types of the applications. Examples of the applications include web browsers, e-mail applications, spreadsheets, video games, other applications that generate viewable objects for display, or any of the application types listed in more detail above. The system memory 416 may store instructions for execution of the applications. The execution of one of the applications on the processor 412 causes the processor 412 to produce graphics data for image content that is to be displayed and the audio data 21 that is to be played (possibly via integrated speaker 105). The processor 412 may transmit graphics data of the image content to the GPU 414 for further processing based on and instructions or commands that the processor 412 transmits to the GPU 414.

The processor 412 may communicate with the GPU 414 in accordance with a particular application processing interface (API). Examples of such APIs include the DirectX® API by Microsoft®, the OpenGL® or OpenGL ES° by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 412 and the GPU 414 may utilize any process, protocol, and/or standard for communication.

The system memory 416 may be the memory for the connected computing device 12. The system memory 416 may comprise one or more computer-readable storage media. Examples of the system memory 416 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 416 may include instructions that cause the processor 412, the GPU 414, and/or the display processor 418 to perform the functions ascribed in this disclosure to the processor 412, the GPU 414, and/or the display processor 418. Accordingly, the system memory 416 may be a computer-readable storage medium having instructions stored thereon that, when executed, cause one or more processors (e.g., the processor 412, the GPU 414, and/or the display processor 418) to perform various functions.

The system memory 416 may include a non-transitory computer-readable storage medium. The term "non-transitory" indicates that the storage medium is not embodied in a carrier wave or a propagated signal. However, the term "non-transitory" should not be interpreted to mean that the system memory 416 is non-movable or that its contents are static. As one example, the system memory 416 may be removed from the source device 12 and moved to another device. As another example, memory, substantially similar to the system memory 416, may be inserted into the connected computing device 12. In certain examples, a non-transitory storage medium may store data that can, over time, change (e.g., in RAM).

The user interface 420 may represent one or more hardware or virtual (meaning a combination of hardware and software) user interfaces by which a user may interface with the source device 12. The user interface 420 may include physical buttons, switches, toggles, lights or virtual versions thereof. The user interface 420 may also include physical or virtual keyboards, touch interfaces—such as a touchscreen, haptic feedback, and the like.

The processor 412 may include one or more hardware units (including so-called "processing cores") configured to perform all or some portion of the operations discussed above with respect to the computing device 12. The transceiver module 422 may represent a unit configured to establish and maintain the wireless connection between the connected computing device 12 and the supporting computing device 14. The transceiver module 422 may represent one or more receivers and one or more transmitters capable of wireless communication in accordance with one or more wireless communication protocols.

The supporting computing device 14 may include components similar to that of the connected computing device 12. Although the computing device 14 may include components similar to that of the connected computing device 12, the computing device 14 may, in certain instances, include only a subset of the components discussed above with respect to the connected computing device 12.

As further shown in the example of FIG. 1, the computing device 14 includes one or more speakers 502, a processor 512, a system memory 516, a user interface 520, a transceiver module 522, and one or more microphones 18. The processor 512 may be similar or substantially similar to the processor 412. In some instances, the processor 512 may differ from the processor 412 in terms of total processing capacity or may be tailored for low power consumption. The system memory 516 may be similar or substantially similar to the system memory 416. The speakers 502, the user interface 520, and the transceiver module 522 may be similar to or substantially similar to the respective speakers 402, user interface 420, and transceiver module 422. The computing device 14 may also optionally include a display 500, although the display 500 may represent a low power, low resolution (potentially a black and white LED) display by which to communicate limited information, which may be driven directly by the processor 512.

The processor 512 may include one or more hardware units (including so-called "processing cores") configured to perform all or some portion of the operations discussed above with respect to the processor 412. The transceiver module 522 may represent a unit configured to establish and maintain a wireless connection between the connected computing device 12 and the supporting computing device 14. The transceiver module 522 may represent one or more receivers and one or more transmitters capable of wireless communication in accordance with one or more wireless communication protocols. The transceiver module 522 may maintain the wireless connection to the connected computing device 12.

Although not shown in the example of FIG. 1, one or both of the computing device 12 and the supporting computing device 14 may include one or more of a limited power supply (e.g., a battery) and a fixed power supply (e.g., via an electrical connection to a near limitless power source in terms of the power requirements required to operate one or both of the computing device 12 and the supporting computing device 14). Because of the reliance on a limited power supply, developers of computing devices, such as the computing device 12 and/or the supporting computing device 14, are attempting to conserve power to increase a duration in which the computing device 12 and/or the supporting computing device 14 may remain operational.

To illustrate, consider that the computing device 12 may represent a smartphone that operates primarily via a limited power source, such as a battery, and intermittently a fixed power source (e.g., when charging). Further consider that the supporting computing device 14 may represent wireless headphones that also operate primarily via a limited power source, such as a battery, and intermittently a fixed power source (e.g., when charging). In this instance, power conservation may support minimum expected longevity as defined by the average expectations of the users of such devices. As such, developers have begun to address the components of the computing devices that consume disproportionate amounts of power, such as displays, processors, memory, and transmitters.

With respect to transmitters, radio frequency (RF) or other wireless transmitters that support wireless communication are evolving to consume less power, while still achieving adequate signal to noise ratios (SNR) for communication of data symbols. Recent development of transmitter circuitry has moved away from employing a quadrature modulation (which makes use of Cartesian coordinates) to using a polar modulation (which makes use of polar coordinates).

The so-called "polar transmitter" may represent the data symbols as polar coordinates (e.g., an amplitude and phase), combining the amplitude and phase to produce the output antenna signal. The polar transmitter may use dynamic modulation of the power amplification to transmit amplitude information, thereby resulting in potentially higher average energy efficiency compared to transmitters using quadrature modulation, which requires a linear RF power amplifier.

In the example of FIG. 1, the transceiver module 422 includes a polar transmitter (PT) 100A for communicating wirelessly with the transceiver module 522 of the computing device 14. As further shown in the example of FIG. 1, the transceiver module 522 include a polar transmitter (PT) 100B for communicating wirelessly with the transceiver module 422 of the connected computing device 12. The polar transmitters 100A and 100B ("polar transmitters 100" or "PTs 100") may be similar to one another, if not substantially similar to one another, and reference to the "polar transmitter 100" (singular) may refer to either one of the polar transmitters 100 unless otherwise specified.

The polar transmitter 100 may include a digital frontend circuit (not shown in the example of FIG. 1) that performs modulation and signal conditioning to obtain a digital representation of the amplitude and phase (in either the time or the frequency domain) and an analog backend circuit that converts the digital representation of the amplitude and phase to an analog signal that is processed to produce the antenna output signal (or, in other words, the wireless signal). The digital frontend circuit may modulate the data symbol according to one or more modulation schemes, such as phase-shift keying (PSK), differential PSK (DPSK), quadrature amplitude modulation (QAM), orthogonal frequency-division modulation (OFDM) with raised-cosine, root-raised-cosine or rectangular modulation pulse, etc., to produce a modulated data symbol. The modulated data symbol may be the cartesian coordinate system. The digital frontend circuit may convert, in some instances, the modulated data symbol from the cartesian coordinate system to the polar coordinate system to determine an amplitude and phase values for the modulated data symbol. The digital frontend circuit may next convert the phase to a frequency, outputting the amplitude and frequency to the analog backend circuit.

The analog backend circuit may include a digital-to-analog converter (DAC), a phase locked loop (PLL) circuit for frequency modulation and a power amplifier for amplitude modulation. The DAC may convert the amplitude and frequency from the digital domain (e.g., bits) to the analog domain (e.g., signals) that are used to drive the PLL circuit and the power amplifier. The PLL circuit may include a voltage controlled oscillator (VCO) that controls frequency modulation as a function of the frequency of the analog signal. The power amplifier amplifies the output of the PLL circuit based on the amplitude signal, thereby enabling amplitude modulation.

Although amplitude modulation may enable less power consumption compared to the linear power amplifiers of quadrature transmitters, the PLL circuit of the polar transmitter 100 may become impaired when certain maximum frequency deviations of the VCO are exceeded due to potential limitations of the VCO. Widely used modulation schemes, such as the above noted PSK, DPSK, QAM, OFDM, etc., may result in IQ (in-phase and quadrature components, which is another way to denote the XY axes of the cartesian coordinate system) trajectory crossing the origin, which may lead to a near instantaneous frequency equal to half of the sampling rate. In addition, the digital fronted circuit may upsample the frequency, which may increase the frequency response further to follow the new sample rate. The large changes to the frequency (due in part potentially to upsampling) may exceed the maximum frequency deviations resulting in potential impairments.

As a result, modulators that produce the representations of the data symbol may incorporate a process referred to as zero crossing avoidance (ZCA). ZCA refers to a process that avoids frequency deviations by avoiding the cartesian trajectory passing through the origin. However, as noted above, the upsampling in the digital frontend circuit may greatly increase the frequency deviation, potentially resulting in design compromises.

For example, either ZCA has to be designed to provide more pronounced avoidance so as to reduce the maximum frequency deviation to support the successive upsampling, or the upsampling may be designed not to increase the deviation, which may result in poor pass-band response leading to error vector magnitude (EVM) degradation. Another example compromise may be to leave ZCA and upsampling unchanged, but to design the analog backend circuit to be more capable, which may result in additional consumption of physical board space and power.

In accordance with various aspects of the techniques described in this disclosure, the polar transmitter 100A may include a limiter 102A that is applied after modulation and upsampling that may potentially limit or otherwise reduce conditions (e.g., frequencies that exceed the maximum frequency deviations) that result in impairments, such as instability, to communication of data symbols. Rather than allow a representation of the phase (e.g., the frequency) for any given data symbol to exceed a threshold value, and thereby introduce instability as a result of exceeding a maximum frequency deviation associated with underlying circuitry that support transmission, the limiter 102A may adjust the frequency value to be within the maximum frequency deviation supported by the analog backend circuitry.

As noted above, the polar transmitters 100A and 100B may be similar to one another, if not substantially similar to one another. As such, the polar transmitter 100A includes the limiter 102A, while the polar transmitter 100B includes a limiter 102B, and the limiter 102A may be similar to, if not substantially the same as, the limiter 102B. Further, reference to the "limiter 102" (singular) may refer to either one of the limiters 102 unless otherwise specified.

In operation, the polar transmitter 100 may obtain a data symbol from a number (or, in other words, plurality) of data symbols representative of data to be transmitted wirelessly. The polar transmitter 100 may include a modulator that operates according to one or more of the modulation schemes noted above (e.g., PSK, DPSK, QAM, and/or OFDM). The modulator may receive the data symbol to obtain an IQ sample.

The polar transmitter 100 may next convert the IQ sample to an amplitude and phase representative of the data symbol. Although described as converting the IQ sample to the amplitude and phase representative of the data symbol, the modulator may, in some examples, directly modulate the data symbol to the amplitude and phase representative of the data symbol. In any event, the polar transmitter 100 may convert the phase to a frequency.

At this point, the polar transmitter 100 directs the frequency to limiter 102, where limiter 102 compares the frequency to a threshold frequency (which may also be referred to as a "frequency threshold"). The limiter 102 may then adjust, based on the comparison of the frequency to the threshold frequency, the frequency to obtain an adjusted frequency. For example, the threshold frequency may be configured to be equal to or less than the maximum frequency deviation associated with the VCO of the PLL for the analog backend circuit. When the frequency is greater than the threshold value (or in some instances this may be restated as an absolute value of the frequency is above the maximum frequency deviation), the limiter 102 may reduce the frequency to be below the threshold value, outputting the adjusted frequency to the backend circuit of the polar transmitter.

The backend circuit of the polar transmitter may obtain, based on the amplitude or some representation thereof and the adjusted frequency, a wireless signal. The backend circuit may then transmit the wireless signal via an antenna or other delivery circuit.

In this respect, various aspects of the limiter techniques described in this disclosure may improve operation of the polar transmitter 100 by improving operation of the transmitter 100 itself in terms of potentially reducing instances of impairments due to frequency deviations above the maximum frequency deviation. Potentially reduced instability may result in reduced EVM that potentially improve signal to noise ratios (SNR) without possibly requiring increased power consumption (which may be associated with changes to the analog backend circuitry to accommodate higher frequency deviations). As such, various aspects of the limiter techniques described in this disclosure may improve operation of the polar transmitter 100 itself.

Figure 2:
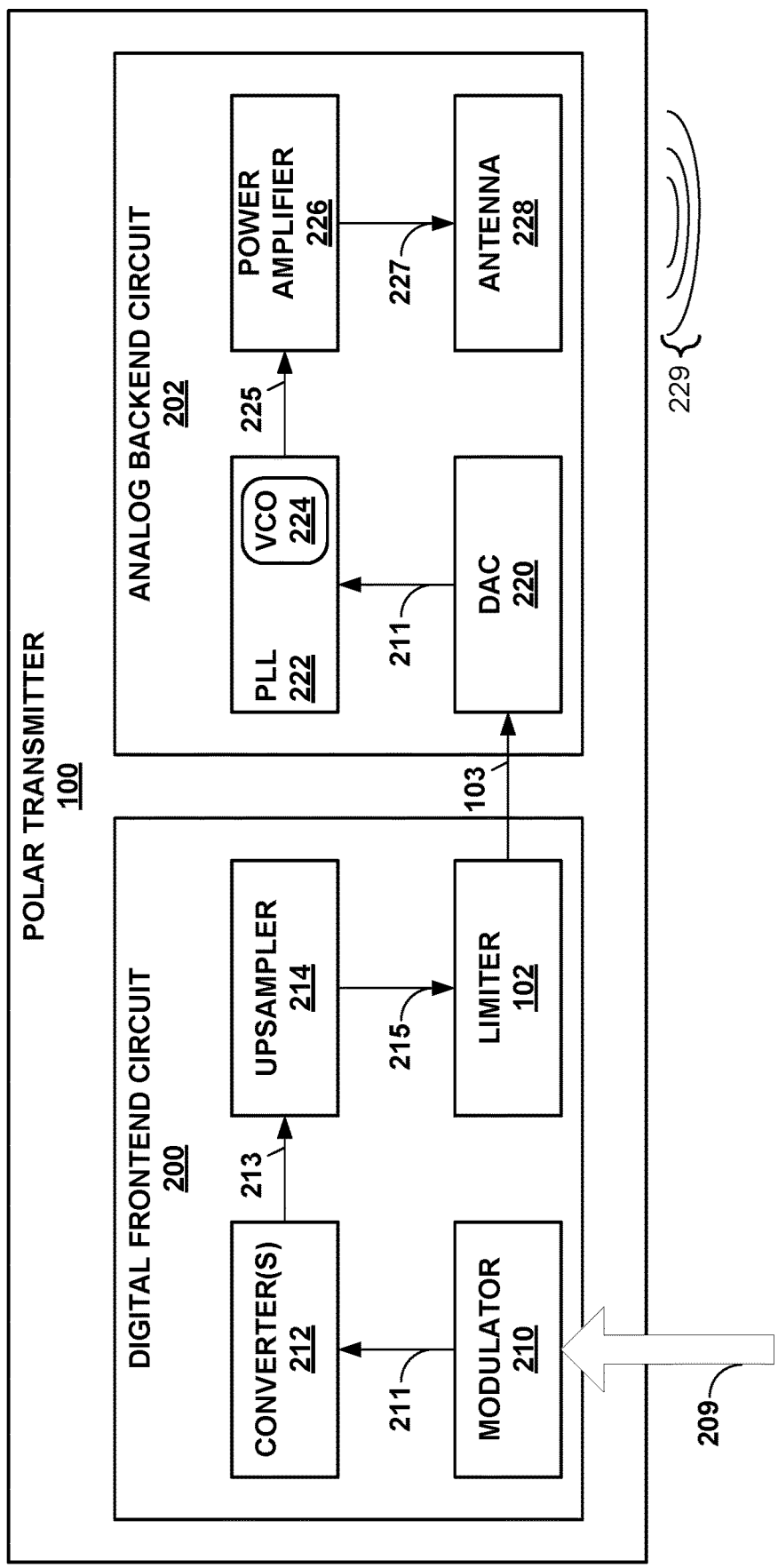
FIG. 2 is a block diagram illustrating a frequency modulation path of the polar transmitter of FIG. 1 in more detail.

FIG. 2 is a block diagram illustrating the polar transmitter of FIG. 1 in more detail. As shown in the example of FIG. 2, the polar transmitter 100 includes a digital frontend circuit 200 and an analog backend circuit 202. While described with respect to the digital frontend circuit 200 and the analog backend circuit 202, the frontend circuit 200 may be, in some examples, an analog frontend circuit, and the backend circuit 202 may be, in these and other examples, a digital backend circuit.

In any event, the digital fronted circuit 200 may include a modulator 210, one or more converters 212, an upsampler 214, and the limiter 102. The modulator 210 may represent a unit configured to obtain a data symbol 209 from a number of data symbols representative of data, and modulate the data symbol 209 according to one of the various modulation schemes discussed in more detail above. The modulator 210 may output either a cartesian representation of the data symbol 209 (e.g., an IQ sample) or a polar representation of the data symbol 209 (e.g., an amplitude and phase), either of which may generally be referred to as a modulated data symbol 211. The modulator 210 may output the modulated data symbol 211 to converters 212.

Converters 212 may represent one or more units configured to convert the modulated data symbol 211 to a frequency representative of the phase. In the example of FIG. 2, only the phase/frequency modulation path is shown and the amplitude modulation path is omitted for ease of illustration purposes. As such, the converters 212 refer to converters for converting the phase to the frequency 213.

In instances where the modulator 210 outputs a cartesian representation of the data symbol 209, the converters 212 may include a coordinate rotation digital computer (CORDIC) configured to convert the cartesian representation of the data symbol 209 to the corresponding polar representation of the data symbol 209, thereby obtaining the phase (which is all that is relevant in the example of FIG. 2, but the CORDIC may also obtain the amplitude as well). In instances where the modulator 210 outputs the polar representation of the data symbol 209, the converters 212 may omit the CORDIC. Regardless, the converters 212 may include at least one unit configured to convert the phase to a frequency, whereupon the converters 212 may output the frequency 213 to the upsampler 214.

The upsampler 214 may represent a unit configured to upsample frequency 213. To potentially reduce power consumption, the modulator 210 may not modulate the data symbol 209 at a maximum sample rate, but at a reduced rate. The upsampler 214 may upsample the frequency 213 to obtain upsampled frequency 215 that potentially conforms to the maximum sample rate. An example of the upsampler 214 is a finite input response (FIR) filter. The upsampler 214 may output the upsampled frequency 215 to the limiter 102.

As described above, the modulator 210 may implement a zero crossing avoidance (ZCA) process in an attempt to eliminate frequency deviations that exceed a maximum frequency deviation supported by the analog backend circuit 202 (and to possibly limit the dynamic range of the signal to be transmitted). A common ZCA implementation may add a pulse with 90 degrees rotated phase and reduced amplitude in case the symbol sequence produces an IQ trajectory crossing zero. The added pulse may be referred to as a kick pulse, and the kick pulse deviates the trajectory from zero and potentially prevents hitting a minimum amplitude and maximum frequency deviation (e.g., a so-called "zero crossing"). Performance versus minimum amplitude/maximum frequency compromises are made by selection of the phase and amplitude of the kick pulse. However, as also described above, the ZCA process may not entirely eliminate the frequency deviations, particularly when upsampling is employed to further reduce power consumption, resulting potentially in a number of the design compromises listed above in one or both of the digital frontend circuit 200 and/or the analog backend circuit 202.

As noted above, the limiter 102 may represent a unit configured to potentially reduce, if not eliminate, frequency deviations that exceed a threshold frequency, which may be configured to be equal to or near the maximum frequency deviation supported by the analog backend circuit 202. Example operation of the limiter 102 is described below in more detail with respect to the examples of FIGS. 3A-3C.

Prior to discussing how the limiter 102 obtains the adjusted frequency 103, a discussion of the analog backend circuit 202 is presented to further elaborate on the various design compromises that arise due to various aspects of the analog backend circuit 202. As further shown in the example of FIG. 2, the analog backend circuit 202 may include a digital-to-analog converter (DAC) 220, a phase locked loop (PLL) circuit 222 that includes a voltage controlled oscillator (VCO) 224, a power amplifier 226, and an antenna 228.

The DAC 220 represents a unit configured to convert the digital representation of the adjusted frequency 103 (which may be referred to as a "digital adjusted frequency 103") to an analog representation of the adjusted frequency 211 (which may be referred to as an "analog adjusted frequency 211"). The DAC 220 outputs the analog adjusted frequency 211 to the PLL circuit 222.

The PLL circuit 222 represents control system circuitry that generates an output signal whose phase is related to the phase of an input signal (i.e., the analog adjusted frequency 211 in this example). The PLL circuit 222 may apply phase modulation directly to a radio frequency (RF) carrier. The VCO 224 may generate a periodic signal, where a phase detector identifies a phase difference between the input signal and the output signal. The phase detector may provide the difference back to the VCO 224 to realign the phase of the input signal with that of the output signal. The PLL circuit 222 may maintain a consistent amplitude in the output signal, thereby allowing for amplitude modulation by the power amplifier 226. The PLL circuit 222 may output the frequency modulated signal 225 to the power amplifier 226.

The power amplifier 226 may represent a unit configured to perform amplitude modulation with respect to the frequency modulated signal 225 to obtain a modulated wireless signal 227. One potential advantage of the polar transmitter 100 over quadrature transmitters is that the power amplifier 226 does not have the linearity requirements as the quadrature transmitter allowing for the use of non-linear amplifier architectures, such as those denoted as Class E or Class F. These architectures may use far less power. In any event, the power amplifier 226 may output the modulated wireless signal 227 to the antenna 228, which may transmit the modulated wireless signal 227 as radio frequency signal 229.

As noted above, the VCO 224 may be tuned to the channel frequency as well as perform the frequency modulation. One design of the VCO combines an input voltage to drive the output channel frequency which may be steady and stable during the modulation period. Both the DAC 220 and the VCO 224 may support fast-changing modulating signals, but both the DAC 220 and the VCO 224 may only tolerate certain maximum voltage ranges, which are translated into a maximum instant (or near instant) frequency of the digital FM output.

Even with ZCA, the addition of upsampler 214 to potentially conserve power may result in the insertion of samples (e.g., via interpolation between two existing samples) may introduce new samples that are close to zero. Whether upsampling occurs in the IQ domain (which is possible via moving of upsampling to occur directly after modulation) or the polar domain, the digital frontend circuit 200 should accommodate the potential limitations of the analog backend circuit 202.

Various solutions to this potential problem may feature drawbacks. For example, an upsampling filter may be designed in which interpolation, e.g., polynomial interpolation, shapes the IQ trajectory to partially suppress new samples getting close to the origin. However, such an upsampling filter may lead to a non-symmetrical finite-impulse response filter having passband delay that may not be constant and a magnitude response may not be flat enough in the given application, resulting in performance degradation.

As another example, an upsampling filter may be designed based on spectral requirements and apply a higher level of ZCA in the modulator, e.g., increase the scaling of the kick pulse or reduce the sub-sampling rate of the kick pulse. However, this second solution requires further pre-compensation by turning up the ZCA which leads to an increase of the EVM.

As a third example, an analog FM path can be designed that supports the higher frequency deviation. However, this third solution may consume more power, require larger components, increase complexity, etc., all of which may result in higher cost.

As such, the limiter 102 may address the foregoing issue without requiring detailed modification of the upsampling filter, the kick pulse or other pre-compensation, and/or potentially adding unreasonable amounts of complexity, power consumption, physical board space. The limiter 102 may adjust the output frequency 215 (and may be considered a post-digital processing process) in a number of different ways. In each instance, the limiter 102 may explicitly limit the instant frequency in the frequency path, potentially ensuring the accumulated phase is maintained so that the polar transmitter 100 may arrive into the same IQ sample for the next symbol.

While described as used with ZCA, the limiter 102 may be used with or without ZCA as implemented by the modulation 210. When used with the modulator 210 that implements ZCA and the upsampler 214, the limiter 102 may result in no or smaller degradation of EVM and transmitted Adjacent Channel Power (ACP) due to the previous up-sampling stage and potentially provides the ability to maintain the low frequency deviation as generated at the modulator's output including ZCA.

In one example, the limiter 102 may adjust a single frequency sample of the frequency 215. That is, the limiter 102 may compare the single frequency sample against the threshold frequency and, when the single frequency sample (or an absolute value thereof) is above the threshold frequency, adjust the single frequency sample to be at or below the threshold frequency. However, only adjusting the single frequency sample may result in a shift in the corresponding phase, thereby potentially increasing the EVM and injecting errors that may result in signal degradation.

Figure 3A:
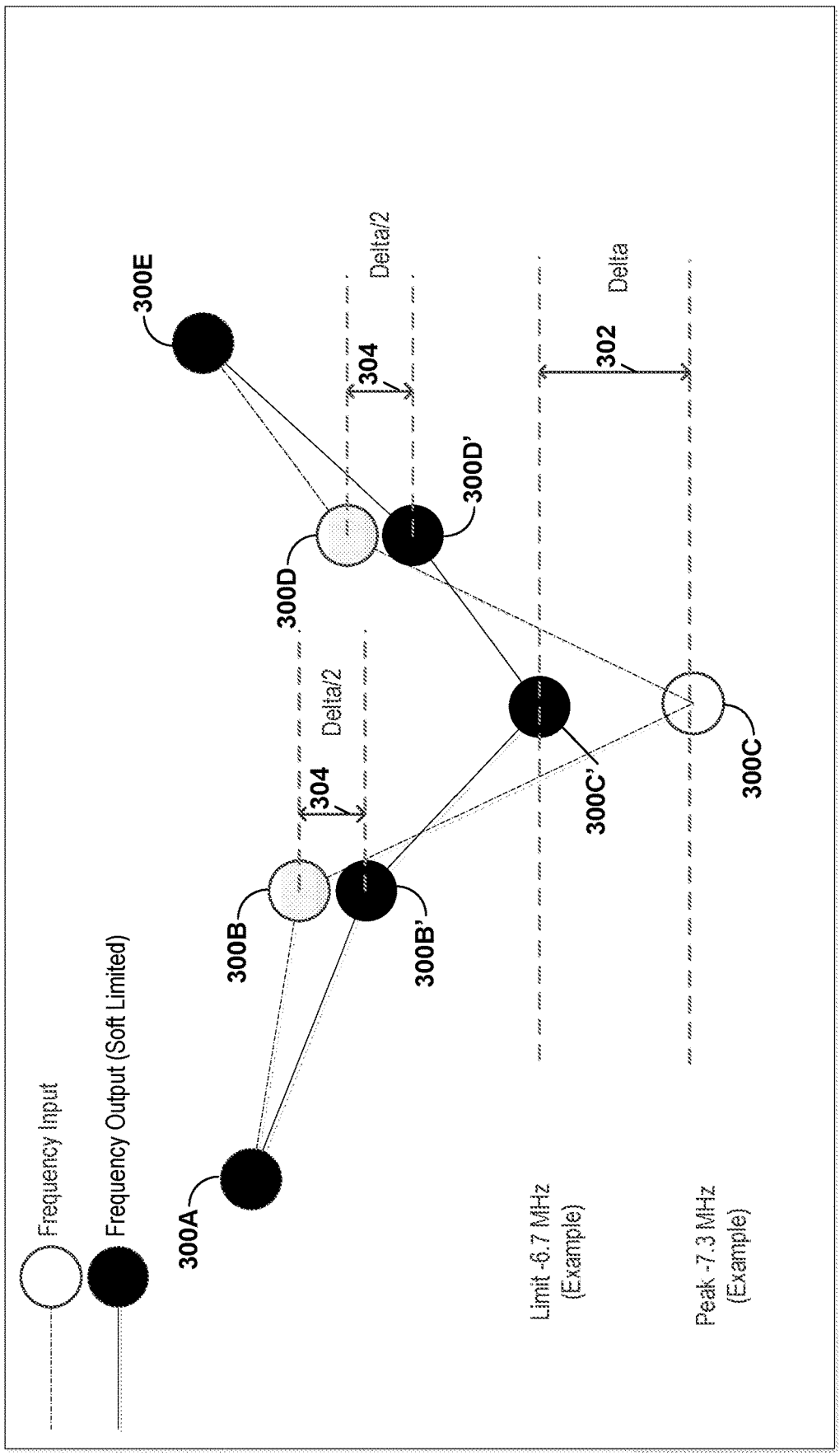
FIGS. 3A-3C are diagrams illustrating example operations of the limiter of FIGS. 1 and 2 in performing various aspects of the techniques described in this disclosure.
Figure 3B:
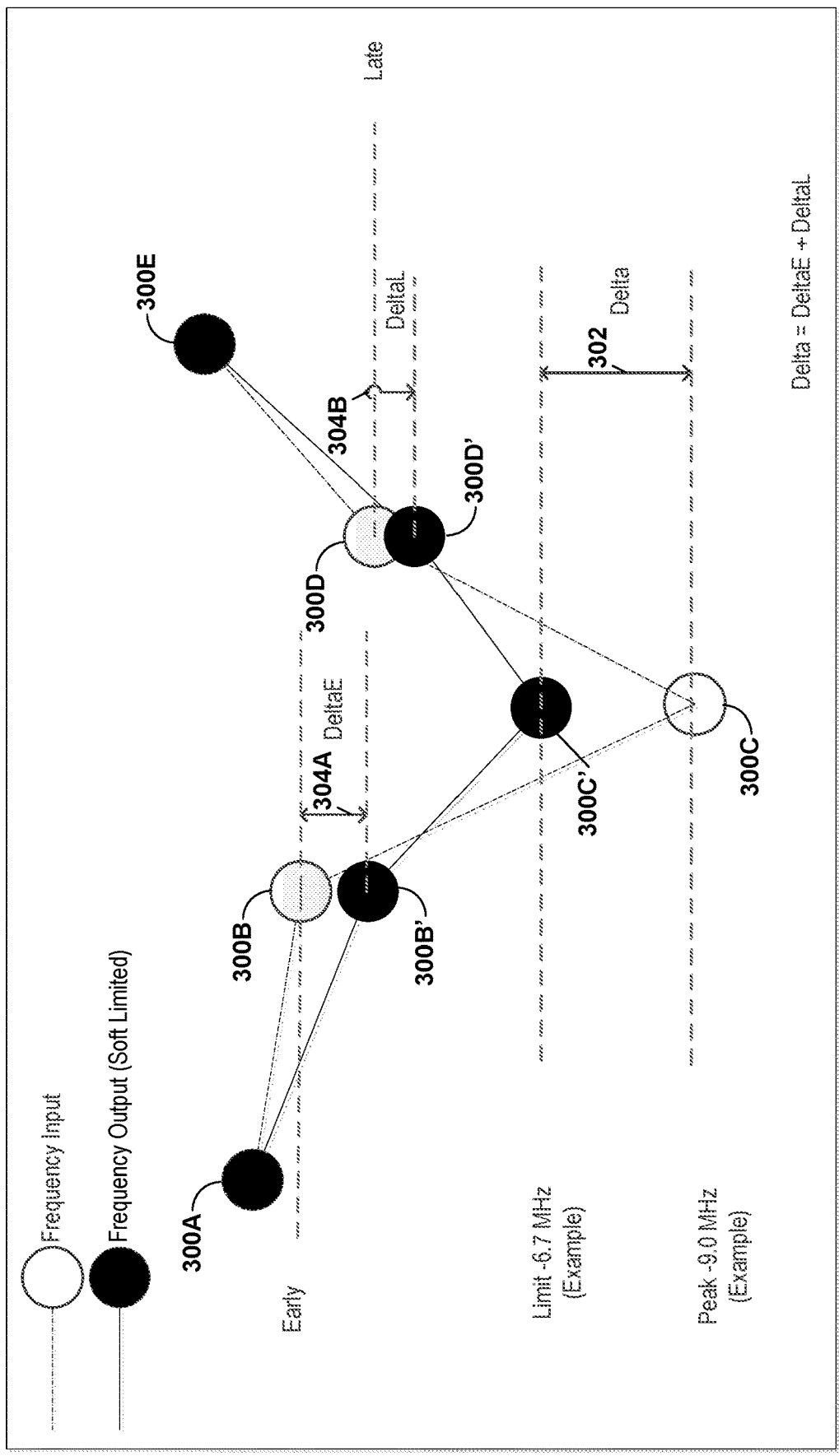
Figure 3C:
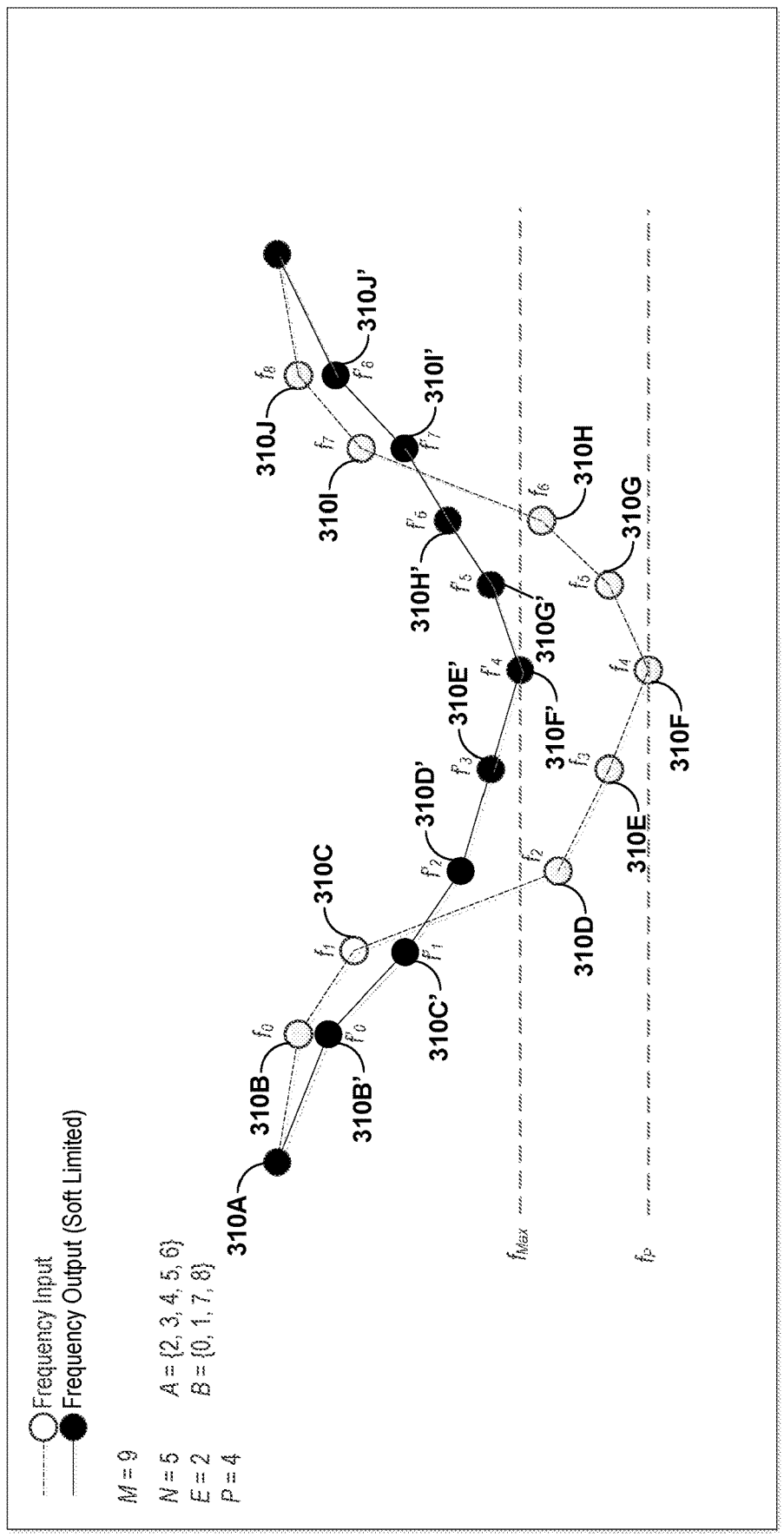

Examples of frequency adjustments that preserve phase are described with respect to the following FIGS. 3A-3C. FIGS. 3A-3C are diagrams illustration example operation of the limiter of FIGS. 1 and 2 in performing various aspects of the techniques described in this disclosure.

Referring first to the example of FIG. 3A, the limiter 102 may consider each of frequency samples 300A-300E in turn, buffering at least three of the samples for reasons that are described in more detail below. The limiter 102 may compare each of the frequency samples 300A-300E to the frequency threshold (which is another way of referring to the "threshold frequency" discussed above), which is assumed for purposes of illustration to be −6.7 mega-Hertz (MHz). The limiter 102 may determine that the frequency sample 300C exceeds the frequency threshold as the frequency sample 300C is −7.3 MHz (and as such the frequency sample 300C may be referred to as an "excessive frequency sample 300C"). The limiter 102 may adjust the frequency sample 300C to be equal to the frequency threshold, replacing the frequency sample 300C with adjusted frequency sample 300C'.

The limiter 102 may next determine a delta 302 as a difference between the frequency sample 300C and the adjusted frequency sample 300C'. The limiter 102 may next adjust the adjacent frequency sample 300B directly preceding (or, in other words, before) the frequency sample 300C (in time), and the adjacent frequency sample 300D directly subsequent (or, in other words, after) the frequency sample 300C (in time). To adjust the adjacent frequency samples 300B and 300D, the limiter 102 may buffer at least three frequency samples (i.e., the frequency samples 300B-300D in this example).

As shown in the example of FIG. 3A, the limiter 102 may determine the adjustment 304B to these adjacent frequency samples 300B and 300D to be half of delta 302. The limiter 102 may then adjust each of the adjacent frequency samples 300B and 300D down by the adjustment 304B to obtain adjusted adjacent frequency samples 300B' and 300D'. The limiter 102 adjusts the adjacent frequency samples 300B and 300D down to compensate for the upward adjustment to the frequency sample 300C, thereby potentially preserving an accurate representation of the phase. The limiter 102 may then replace the adjacent frequency samples 300B and 300D with adjusted adjacent frequency samples 300B' and 300D'.

In the example of FIG. 3B, the limiter 102 operates similar to the example described above with respect to FIG. 3A, except the limiter 102 determines different adjustments 304A and 304B to be applied to the respective adjacent frequency samples 300B and 300D. That is, in the example of FIG. 3A, the limiter 102 determined the same adjustment 304, which the limiter 102 then applied to each of the adjacent frequency samples 300B and 300D. In the example of FIG. 3B, the limiter 102 determines an adjustment 304A that is not equal to the adjustment 304B with the addendum that the adjustment 304A (which is denoted as "DeltaE") when added to the adjustment 304B (which is denoted as "DeltaL") equals the adjustment 302 (which is denoted as "Delta").

As such, the limiter 102 may perform an interpolation to evaluate the two closest adjacent frequency samples 300B and 300D. For example, the limiter 102 may perform a polynomial interpolation with a constraint that a difference between the peak frequency and the limiting frequency (Delta 304) is added to the early adjacent frequency sample 300B (DeltaE) and the late adjacent frequency sample 300B (DeltaL) so that the accumulated phase is maintained (Delta=DeltaE+DeltaL).

Another example of an interpolation that could be designed in a way that both the new adjacent samples scale from their original values by a factor c>1 is set forth in the following equations:

$$\text{Early} + \text{DeltaE} = \text{Early} \times c \quad (1)$$

$$\text{Late} + \text{DeltaL} = \text{Late} \times c \quad (2)$$

which may result in the following limiter:

$$DeltaE = \frac{\text{Delta} \times \text{Early}}{\text{Early} + \text{Late}} \quad (3)$$

$$DeltaL = \frac{\text{Delta} \times \text{Late}}{\text{Early} + \text{Late}} \quad (4)$$

Early may refer to the frequency sample 300B in this example, while Late may refer to the frequency sample 300D. The foregoing limiter design may allow for recovery of more frequency deviation increase, for the same range of over-sampling ratios.

In the example of FIG. 3C, the frequency 215 may include frequency samples 310A-310J ("frequency samples 310"), where a number of the frequency samples 310 exceed the frequency threshold (i.e., the frequency samples 310D-310H in the example of FIG. 3C). The limiter 102 may adjust the excessive frequency samples 310D-310H to obtain adjusted frequency samples 310D'-310H', while also adjusting multiple adjacent frequency samples both preceding (before— such as the frequency samples 310B and 310C) and subsequent (after—such as the frequency samples 310I and 310J) to compensate for the adjustment to the excessive frequency samples 310D-310H.

The foregoing adjustment may be useful when the over-sampling rate is high after the up-sampling stage, such as 32 and higher. An example design is given below. The design may consider M consecutive frequency samples $f_0, f_1, \ldots, f_{M-1}$ from which absolute value of N consecutive samples $f_E, f_{E+1}, \ldots, f_{E+N-1}$ are above the maximum limiting frequency $f_{Max}$:

$$|f_i| > f_{Max} \text{ for } i \in A \quad (5)$$

$$|f_i| \leq f_{Max} \text{ for } i \in B \quad (6)$$

Where a set $A \triangleq \{E, E+1, \ldots, E+N-1\}$ is defined as indices of samples above the threshold and set $B \triangleq \{0, \ldots, E-1, E+N, \ldots, M-1\}$ is defined as indices of samples below the threshold. The algorithm is defined such that the samples above the threshold are all scaled down by factor $c_1 < 1$ and the samples below the threshold are scaled up by a factor $c_2 > 1$ with the two constraints:

$$c_1 \triangleq \frac{f_{Max}}{f_P} \text{ where } P = \text{argmax}_{i \in A}(f_i) \quad (7)$$

$$\Delta \triangleq \Sigma_{i \in A} f_i - \Sigma_{i \in A} c_1 f_i = \Sigma_{i \in B} c_2 f_i - \Sigma_{i \in B} f_i \quad (8)$$

Symbol Δ may represent the overall accumulated phase difference by limiting the samples above the threshold, and it may be required that this symbol be equal to the opposite of the overall accumulated phase difference of the samples below the threshold within the window of M samples. Substituting (7) into (8), the scaling factor $c_2$ can be expressed as follows:

$$c_2 = \frac{\left(1 - \frac{f_{Max}}{f_P}\right) \sum_{i \in A} f_i}{\sum_{i \in B} f_i} + 1 \quad (9)$$

The output samples, denoted with comma, may be $$f'_i = c_1 f_i \text{ for } i \in A \quad (10)$$

$$f'_i = c_2 f_i \text{ for } i \in B \quad (11)$$

In this way, the limiter 102 may adjust the frequency 215 to obtain the adjusted frequency 103. As such, the limiter 102 may be used to directly limit the instantaneous frequency in the digital domain. In case of the limiting frequency being relatively close to half of the sampling rate, this architecture may allow a low complex design of the limiter 102 and a potentially efficient way of ensuring the VCO maximum input frequency will not be exceeded after digital-to-analogue reconstruction. The foregoing limiter design may address high over-sampling ratios where the instant frequency may cross the maximum frequency limit at more than one consecutive sample.

In a polar transmitter design with ZCA modulator and up-sampling stage, this limiting of the frequency 215 may allow for recovery from the increased maximum frequency deviation introduced in the up-sampling stage. Various systems with a particular modulation scheme, ZCA technique, up-sampling stage design, may introduce a different increase in the frequency deviation. Various analogue FM path designs may also require different limits on the maximum input frequency from the digital transmitter. Potentially restoring the low frequency deviation after the up-sampling stage allows to either utilize the Analogue FM path more efficiently with less aggressive ZCA with better performance (e.g., in terms of EVM/ACP) and/or allows design of the analogue FM path to be potentially more power and resource efficiently with potentially the same performance (e.g., in terms of EVM/ACP).

The limiter operation described above with respect to FIG. 3A is designed to potentially only limit a single peak which is above the maximum allowed frequency while impacting two adjacent samples. This first design may be suitable for recovering of up to 35% increase of the original frequency deviation with potentially little to no EVM and ACP degradation, which may be suitable for low over-sampling rates. One assumption in this first design is that the closest adjacent samples to the peak are of similar frequency when a frequency peak is detected. This assumption may occur when the sample of the peak are close to an ideally interpolated peak in the continuous domain. This first design is described in more detail with respect to the example shown in FIG. 4.

Figure 4:
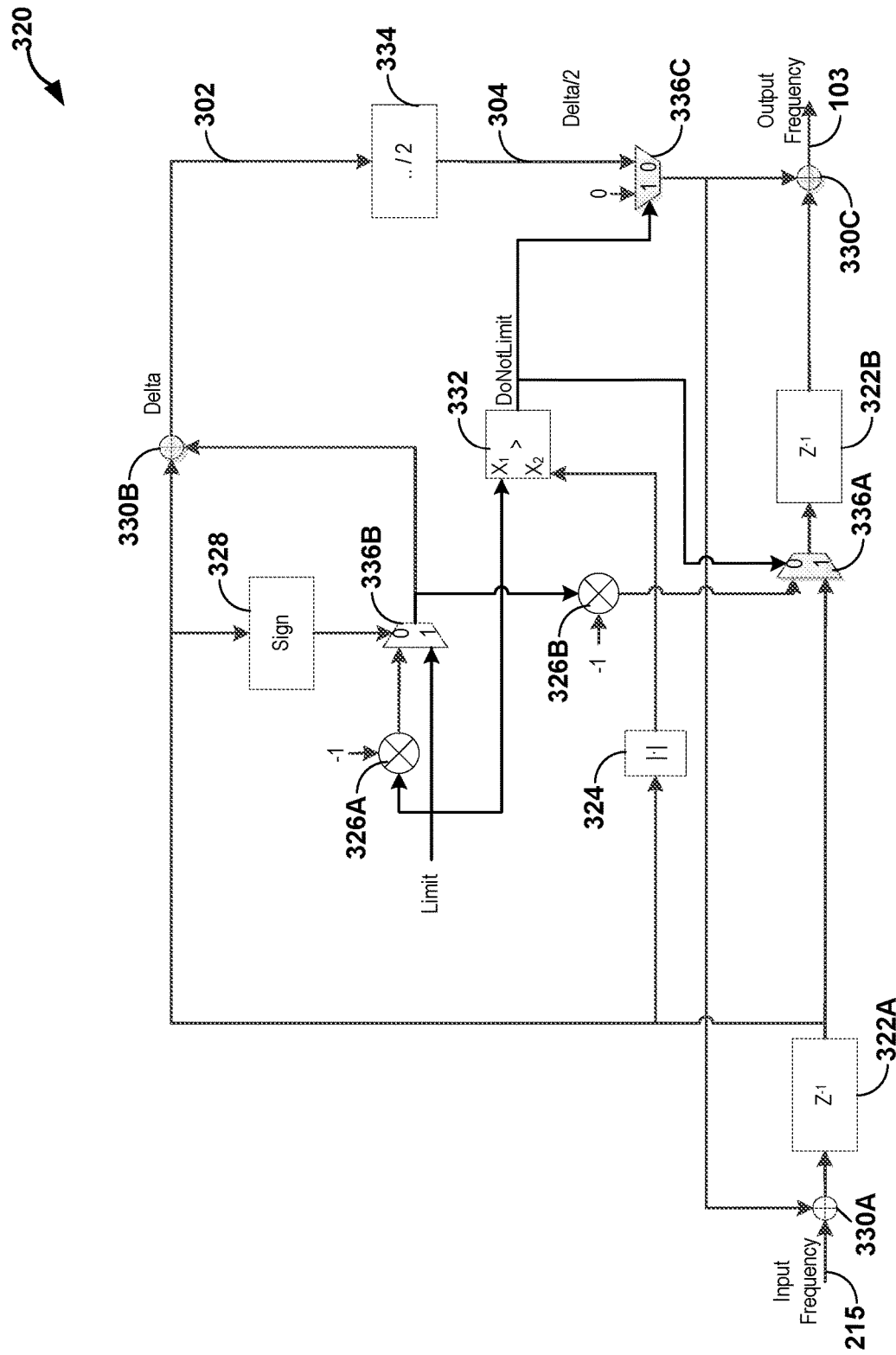
FIG. 4 is a circuit diagram illustrating an example circuit representative of the limiter shown in FIGS. 1 and 2 that performs various aspects of the limiter techniques described in this disclosure.

FIG. 4 is a circuit diagram illustrating an example circuit representative of the limiter shown in FIGS. 1 and 2 that performs various aspects of the limiter techniques described in this disclosure. As shown in the example of FIG. 4, the circuit 320 includes two buffers 322A-322C, an absolute value unit 324, sign inverters 326A and 326B, a sign detector 328, an add unit 330 (which may also be referred to as an "adder 330"), a comparison unit 332 (which may also be referred to as a "comparator 332"), a right shift unit 334, and multiplexors 336A-336C.

The add unit 330A represents a unit configured to add the input frequency 215 to the output of multiplexor 336C, which may output zero (when no adjustment is necessary) or adjustment 304 (which is delta right shifted by one bit— which is equivalent to a divide by two). The output of the add unit 330A is buffered by buffer 322A (for a single clock cycle). The buffer 322A outputs the result of the add unit 330A for the next clock cycle to the multiplexor 336A, which selects either the result of the add unit 330A or the output of the multiplexor 336B (with the sign of the output inverted by the sign inversion unit 326B) based on the output of the comparison unit 332.

Further, in the same clock cycle, the buffer 322A outputs the result of the add unit 330A to the absolute value unit 324, the sign detector 328, and the add unit 330B. The absolute value unit 324 may output the absolute value of the result of the add unit 330A to the comparison unit 332. The sign detector 328 may identify a sign of the output of the result of the add unit 330A, and output a one when a positive sign is detected and a zero when a negative sign is detected. The multiplexor 336B may switch between a positive and negative frequency threshold (which may also be referred to as a "limit") based on the output of the sign detector 328, allowing the output of the sign inverter 326A as applied to the limit through when the output of the sign detector 328 is zero and the limit itself when the output of the sign detector 328 is one.

The output of the multiplexor 336B is provided to both the add unit 330B and the sign inverter 326B. The add unit 330B determines the delta 302 as the difference between the frequency threshold (or "limit") and the output of the buffer 322A. Meanwhile, the comparison unit 332 compares the limit to the absolute value of the output of the buffer 322A to generate a control signal with a zero indicating "limit" and a one indicating "do not limit." In other words, the control signal is provided to the multiplexors 336A and 336C. When the control signal is zero, the multiplexor 336A outputs the signal buffered to the buffer 322A, which is buffered another clock cycle by the buffer 322B. The control signal, when zero, also indicates that the delta/2 signal 304 is output to the add units 330A and 330C, thereby adjusting two adjacent frequency sample (with the excessive frequency sample being set to the limit (adjusted based on the sign inverter 326B).

When the control signal is one, the multiplexor 336A outputs the limit as inverted by sign inverter 326B to the buffer 322A. Also, when the control signal is one, the multiplexor 336C outputs a value of zero to the add units 330A and 330C, thereby refraining from adjusting the frequency samples and/or replacing the excessive frequency sample with the limit.

Figure 5C:
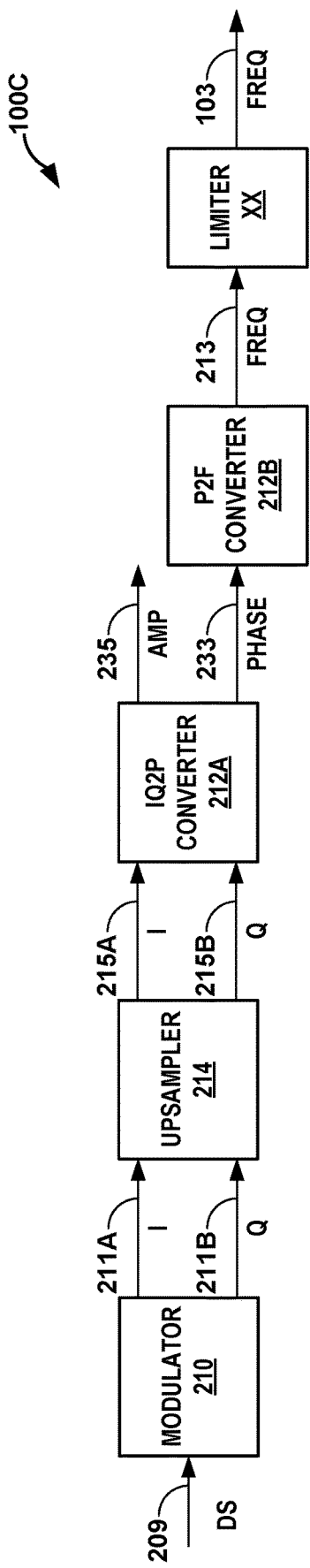

FIGS. 5A-5D are block diagrams illustrating different transmitter architectures in which various aspects of the limiter techniques described in this disclosure may be performed. In the example of FIG. 5A, a first example of the polar transmitter 100 of FIGS. 1 and 2 is shown as a polar transmitter 100A. The polar transmitter 100A includes a modulator 210, an IQ to polar (IQ2P) converters 212A, a phase-to-frequency (P2F) converter 212B, and the limiter 102.

The modulator 210 modulates the data symbol (DS) 209 to generate an I signal 211A, and a Q signal 211B, which together are representative of the data symbol 209. The modulator 210 outputs the I signal 211A and the Q value 211B to IQ2P converter 212A. The IQ2P converter 212A converts the I signal 211A and the Q signal 211B to an amplitude 235 and a phase 233. As noted above, the limiter 102 applies to the phase/frequency path and, as such, the amplitude path 235 is not shown in the examples of FIGS. 5A-5D. In any event, the IQ2P converter 212A outputs the phase 233 to the P2F converters 212B. The P2F converter 212B converts the phase 233 to the frequency 213, which is then adjusted by the limiter 102 in the manner described in more detail above to obtain the adjusted frequency 103.

In the example of FIG. 5B, a second example of the polar transmitters 100 shown in FIGS. 1 and 2 is shown as a polar transmitter 100B. The polar transmitter 100B is similar to the polar transmitter 100A of FIG. 5A except that the modulator 210 modulates the data symbol 209 to generate the amplitude 235 and phase 233 (which again are, when combined, representative of the data symbol 209), thereby eliminating the IQ2P converter 212A.

In the example of FIG. 5C, a third example of the polar transmitters 100 shown in FIGS. 1 and 2 is shown as a polar transmitter 100C. The polar transmitter 100C is similar to the polar transmitter 100A of FIG. 5A except that the polar transmitter 100C further includes an upsampler 214 that upsamples the I signal 211A and the Q signal 211B output by the modulator 210 to produce an upsampled I signal 215A and an upsampled Q signal 215B. The polar transmitter 100C also differs from the polar transmitter 100 shown in FIG. 2 as the upsampling occurs in the IQ domain rather than in the polar domain (e.g., the amplitude and phase domain).

Figure 5D:
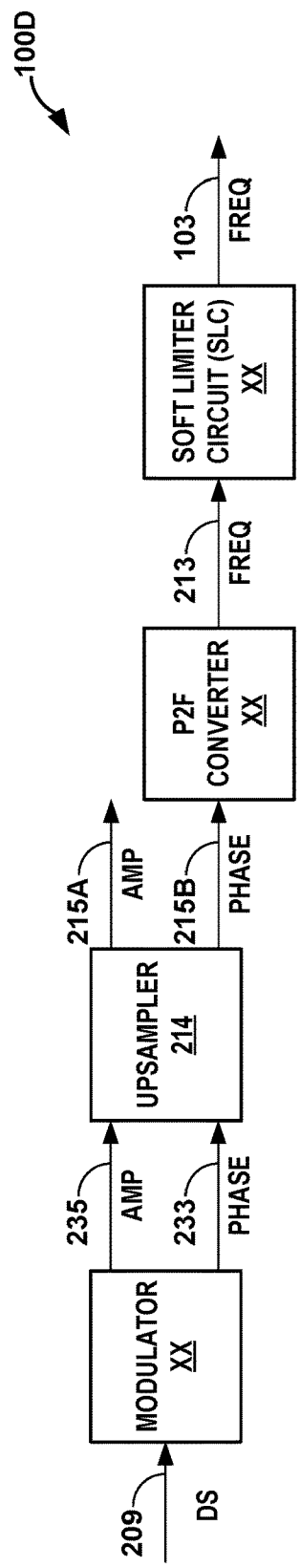

In the example of FIG. 5D, a fourth example of the polar transmitters 100 shown in FIGS. 1 and 2 is shown as a polar transmitter 100D. The polar transmitter 100D is similar to the polar transmitter 100B of FIG. 5B except that the polar transmitter 100D includes an upsampler 214 that upsamples the amplitude 235 and the phase 233 output by the modulator 210 to produce an upsampled amplitude 215A and an upsampled phase 215B. As such, the polar transmitter 100D is similar to the polar transmitter 100 shown in the example of FIG. 2.

As shown in the above examples of FIGS. 5C and 5D, the limiter 102 may be placed between the output of the up-sampling stage and FM output to the analogue. The transmitters 100C and 100D may represent a polar transmitter. Although described with respect to a polar transmitter 100, the techniques may be applied to other transmitters of various types that also suffer from issues with zero crossing.

FIG. 6 is a diagram illustrating an example result of various aspects of the limiter techniques in terms of a power spectral density of a modulated signal with zero crossing avoidance. FIG. 7 is a diagram illustrating an example result of various aspects of the limiter techniques in terms of a frequency modulated waveform with limited frequency.

Figure 8:
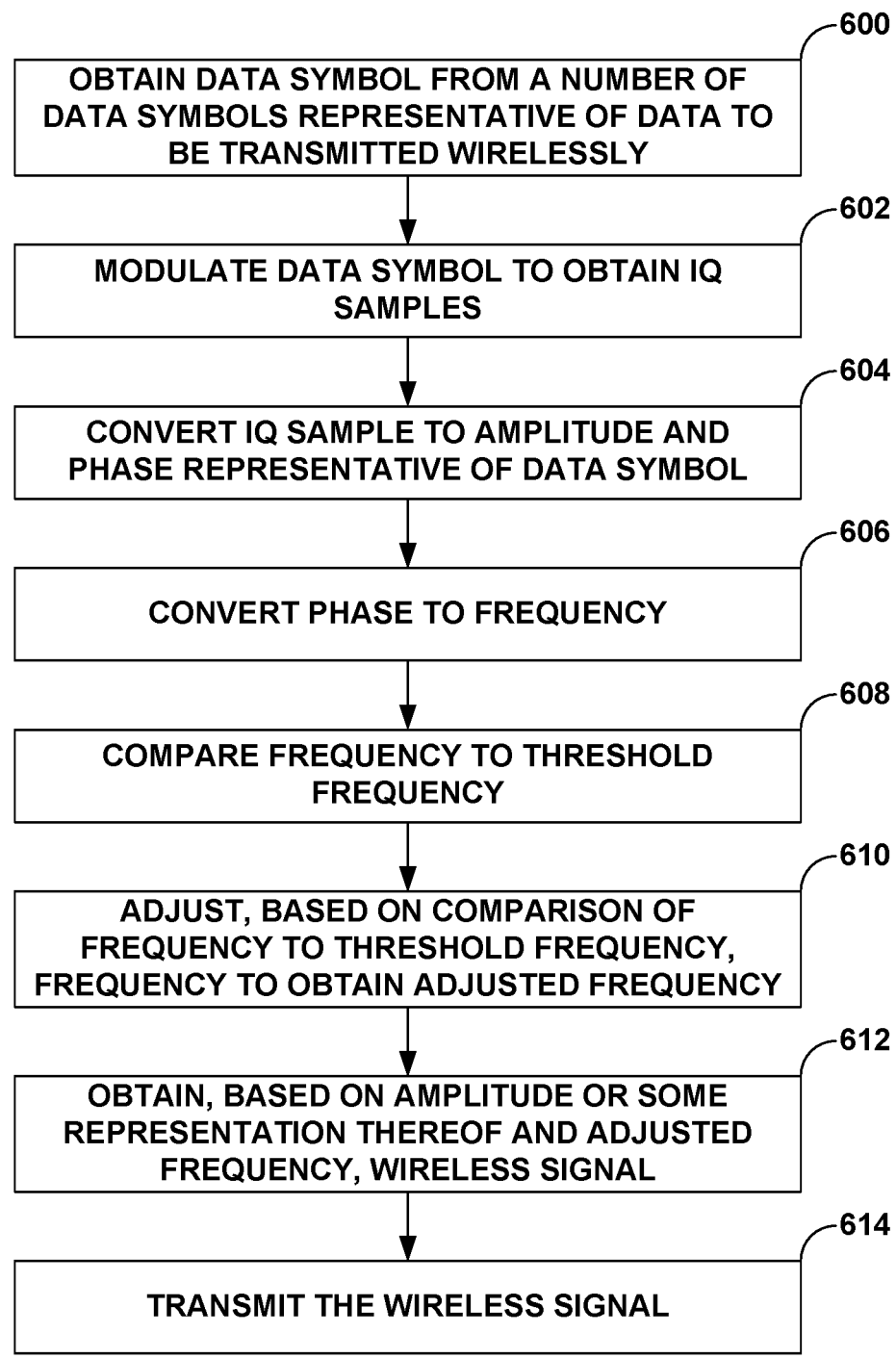
FIG. 8 is a flowchart illustrating example operation of the system shown in the example of FIG. 1 in performing various aspects of the limiter techniques.

FIG. 8 is a flowchart illustrating example operation of the system shown in the example of FIG. 1 in performing various aspects of the limiter techniques. The polar transmitter 100 may first obtain a data symbol from a number (or, in other words, plurality) of data symbols representative of data to be transmitted wirelessly (600). The polar transmitter 100 may include a modulator that operates according to one or more of the modulation schemes noted above (e.g., PSK, DPSK, QAM, and/or OFDM). The modulator may modulate the data symbol to obtain an IQ sample (602).

The polar transmitter 100 may next convert the IQ sample to an amplitude and phase representative of the data symbol (604). Although described as converting the IQ sample to the amplitude and phase representative of the data symbol, the modulator may, in some examples, directly modulate the data symbol to the amplitude and phase representative of the data symbol. In any event, the polar transmitter 100 may convert the phase to a frequency (606).

At this point, the polar transmitter 100 directs the frequency to limiter 102, where limiter 102 compares the frequency to a threshold frequency (608). The limiter 102 may then adjust, based on the comparison of the frequency to the threshold frequency, the frequency to obtain an adjusted frequency (610). For example, the threshold frequency may be configured to be equal to or less than the maximum frequency deviation associated with the VCO of the PLL for the analog backend circuit. When the frequency is greater than the threshold value (or in some instances this may be restated as an absolute value of the frequency is above the maximum frequency deviation), the limiter 102 may reduce the frequency to be below the threshold value, outputting the adjusted frequency to the backend circuit of the polar transmitter.

The backend circuit of the polar transmitter may obtain, based on the amplitude or some representation thereof and the adjusted frequency, a wireless signal (612). The backend circuit may then transmit the wireless signal via an antenna or other delivery circuit.

In this way, the limiter 102 (which may be referred to as a "soft limiter") is designed to potentially assure the IQ trajectory arrives at the same sample point for the second symbol of the two causing the zero crossing. The above described approach may offer an improvement in EVM and a new degree of flexibility to achieve the combination of the desired performance versus design parameters. Three examples of the limiter 102 are presented above from the one that only adjusted two adjacent samples with no interpolation which may be hardware cheap with low-to-medium limiting efficiency and allow for comparatively low oversampling rates, to a design that limits multiple samples with an interpolation process to tackle high limiting efficiency and high over-sampling rates.

In each of the various instances described above, it should be understood that the device 12 may perform a method or otherwise comprise means to perform each step of the method for which the device 12 is described above as performing. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the device 12 has been configured to perform.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

Likewise, in each of the various instances described above, it should be understood that the device 14 may perform a method or otherwise comprise means to perform each step of the method for which the device 14 is configured to perform. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the device 14 has been configured to perform.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the techniques have been described. These and other aspects of the techniques are within the scope of the following claims.

What is claimed is:

1. A transmitter configured to support wireless communication, the transmitter comprising:
   a frontend circuit configured to:
   obtain a data symbol of a plurality of data symbols representative of data to be transmitted wirelessly;
   determine an amplitude and a phase representative of the data symbol;
   transform the phase to a frequency;
   compare the frequency to a threshold frequency; and
   adjust, based on the comparison of the frequency to the threshold frequency, the frequency to obtain an adjusted frequency; and a backend circuit configured to:
obtain, based on the amplitude and the adjusted frequency, a wireless signal; and
transmit the wireless signal.

2. The transmitter of claim 1, wherein the backend circuit is configured to perform frequency modulation to obtain the wireless signal, the backend circuit having a maximum frequency deviation that is greater than or equal to the threshold frequency.

3. The transmitter of claim 1, wherein the backend circuit includes a phase locked loop circuit in which a voltage controlled oscillator is configured to perform frequency modulation based on the frequency, the voltage controlled oscillator having a maximum frequency deviation that is greater than or equal to the threshold frequency.

4. The transmitter of claim 1, wherein the frontend circuit is configured to adjust, based on the comparison of the frequency to the threshold frequency, a single frequency sample to obtain the adjusted frequency.

5. The transmitter of claim 1,
wherein the frequency comprises a plurality of frequency samples,
wherein the frontend circuit is configured to:
adjust, based on the comparison of the frequency to the threshold frequency, an excessive frequency sample of the plurality of frequency samples to be above the threshold frequency; and
adjust one or more frequency samples of the plurality of frequency samples adjacent to the excessive frequency sample to offset the adjustment to the excessive frequency sample, and
wherein the adjusted frequency comprises the adjusted excessive frequency sample and the one or more adjusted adjacent frequency samples.

6. The transmitter of claim 5, wherein the one or more adjacent frequency samples include a first adjacent frequency sample that is directly before the excessive frequency sample in the plurality of frequency samples and a second adjacent frequency sample that is directly after the excessive frequency sample in the plurality of frequency samples.

7. The transmitter of claim 5,
wherein the one or more adjacent frequency samples include multiple adjacent frequency samples that are before the excessive frequency sample in the plurality of frequency samples and multiple adjacent frequency samples that are directly after the excessive frequency sample in the plurality of frequency samples, and
wherein the frontend circuit is configured to interpolate the adjustment to the excessive frequency samples across the multiple adjacent frequency samples that are before the excessive frequency sample and the mutliple adjacent frequency samples that are directly after the excessive frequency sample.

8. The transmitter of claim 1,
wherein the frontend circuit comprises a digital frontend circuit that is configured to obtain a digital representation of the data symbols, and
wherein the backend circuit comprises an analog backend circuit that is configured to transmit the wireless signal as a radio frequency signal.

9. The transmitter of claim 1, wherein the digital frontend circuit includes:
a modulator configured to modulate, according to one or more modulation schemes, the data symbol to obtain an in-phase and quadrature (IQ) sample; and a converter configured to convert the IQ sample to the amplitude and the phase.

10. The transmitter of claim 9, wherein the one or more modulation schemes include phase-shift keying (PSK), differential PSK (DPSK), quadrature amplitude modulation (QAM), and orthogonal frequency-division modulation (OFDM).

11. The transmitter of claim 1, wherein the frontend circuit is further configured to upsample the frequency prior to comparing the frequency to the threshold frequency.

12. The transmitter of claim 1, wherein the transmitter comprises a polar transmitter.

13. The transmitter of claim 1, wherein the transmitter is part of a handset.

14. A method of supporting wireless communication, the method comprising:
obtaining, by a frontend circuit of a transmitter, a data symbol of a plurality of data symbols representative of data to be transmitted wirelessly;
determining, by the frontend circuit, an amplitude and a phase representative of the data symbol;
transforming, by the frontend circuit, the phase to a frequency;
comparing, by the frontend circuit, the frequency to a threshold frequency;
adjusting, by the frontend circuit and based on the comparison of the frequency to the threshold frequency, the frequency to obtain an adjusted frequency;
obtaining, by a backend circuit and based on the amplitude and the adjusted frequency, a wireless signal; and
transmitting, by the backend circuit, the wireless signal.

15. The method of claim 14, wherein obtaining the wireless signal comprises performing frequency modulation to obtain the wireless signal, the backend circuit having a maximum frequency deviation that is greater than or equal to the threshold frequency.

16. The method of claim 14, further comprising performing, by a voltage controlled oscillator of the backend circuit, frequency modulation based on the frequency, the voltage controlled oscillator having a maximum frequency deviation that is greater than or equal to the threshold frequency.

17. The method of claim 14, wherein adjusting the frequency comprises adjusting, based on the comparison of the frequency to the threshold frequency, a single frequency sample to obtain the adjusted freequency.

18. The method of claim 14,
wherein the frequency comprises a plurality of frequency samples,
wherein adjusting the frequency comprises:
adjusting, based on the comparison of the frequency to the threshold frequency, an excessive frequency sample of the plurality of frequency samples to be above the threshold frequency; and
adjusting one or more adjacent frequency samples of the plurality of frequency samples adjacent to the excessive frequency sample to offset the adjustment to the excessive frequency sample, and
wherein the adjusted frequency comprises the adjusted excessive frequency sample and the one or more adjusted adjacent frequency samples.

19. The method of claim 18, wherein the one or more adjacent frequency samples include a first adjacent frequency sample that is directly before the excessive frequency sample and a second adjacent frequency sample that is directly after the excessive frequency sample.

20. The method of claim 19,
wherein the one or more adjacent frequency samples include multiple adjacent frequency samples that are before the excessive frequency sample and multiple adjacent frequency samples that are directly after the excessive frequency sample, and
wherein adjusting the frequency comprises interpolating the adjustment to the excessive frequency samples across the multiple adjacent frequency samples that are before the excessive frequency sample and the multiple adjacent frequency samples that are directly after the excessive frequency sample.

21. The method of claim 14,
wherein obtaining the data symbols comprises obtaining, by a digital frontend circuit, a digital representation of the data symbols, and
wherein transmitting the wireless signal comprises transmitting, by an analog backend circuit, the wireless signal as a radio frequency signal.

22. The method of claim 14, wherein determining the amplitude and the phase comprises:
modulating, according to one or more modulation schemes, the data symbol to obtain an in-phase and quadrature (IQ) sample; and
converting the IQ sample to the amplitude and the phase.

23. The method of claim 22, wherein the one or more modulation schemes include phase-shift keying (PSK), differential PSK (DPSK), quadrature amplitude modulation (QAM), and orthogonal frequency-division modulation (OFDM).

24. The method of claim 14, further comprising upsampling, by the frontend circuit, the frequency prior to comparing the frequency to the threshold frequency.

25. The method of claim 14, wherein the transmitter comprises a polar transmitter.

26. The method of claim 14, wherein a handset includes the transmitter.

27. A non-transitory computer-readable medium having stored thereon instructions that, when executed, cause one or more processors of a transmitter to:
obtain a data symbol of a plurality of data symbols representative of data to be transmitted wirelessly;
determine an amplitude and a phase representative of the data symbol;
transform the phase to a frequency;
compare the frequency to a threshold frequency;
adjust, based on the comparison of the frequency to the threshold frequency, the frequency to obtain an adjusted frequency; and
output, to an analog backend circuit, the adjusted frequency for producing and transmitting a wireless signal representative of the data symbol.

28. An apparatus configured to support wireless communication, the apparatus comprising:
means for obtaining a data symbol of a plurality of data symbols representative of data to be transmitted wirelessly;
means for determining an amplitude and a phase representative of the data symbol;
means for transforming the phase to a frequency;
means for comparing the frequency to a threshold frequency;
means for adjusting, based on the comparison of the frequency to the threshold frequency, the frequency to obtain an adjusted frequency;
means for obtaining, based on the amplitude and the adjusted frequency, a wireless signal; and
means for transmitting the wireless signal.

* * * * *